United States Patent
Zhao et al.

(10) Patent No.: US 8,897,194 B2
(45) Date of Patent: Nov. 25, 2014

(54) METHOD AND DEVICE FOR DETERMINING SINGLE FREQUENCY NETWORK AREA

(75) Inventors: Guosheng Zhao, Beijing (CN); Wenqing Wang, Beijing (CN); Hai Bi, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 341 days.

(21) Appl. No.: 12/531,097

(22) PCT Filed: Mar. 11, 2008

(86) PCT No.: PCT/CN2008/070466
§ 371 (c)(1),
(2), (4) Date: Dec. 28, 2009

(87) PCT Pub. No.: WO2008/113286
PCT Pub. Date: Sep. 25, 2008

(65) Prior Publication Data
US 2010/0105366 A1    Apr. 29, 2010

(30) Foreign Application Priority Data

Mar. 16, 2007  (CN) .......................... 2007 1 0064519

(51) Int. Cl.
 *H04H 20/71* (2008.01)
 *H04W 72/00* (2009.01)
(52) U.S. Cl.
 CPC ................................ *H04W 72/005* (2013.01)
 USPC ........................................ 370/312; 370/328
(58) Field of Classification Search
 CPC .................................................. H04W 72/005
 See application file for complete search history.

(56) References Cited

U.S. PATENT DOCUMENTS

| 5,260,988 A * | 11/1993 | Schellinger et al. ........ 455/552.1 |
| 2004/0008646 A1* | 1/2004 | Park et al. ..................... 370/331 |

(Continued)

FOREIGN PATENT DOCUMENTS

| CN | 1825992 | 8/2006 |
| CN | 1867180 | 11/2006 |
| CN | 1918821 | 2/2007 |

OTHER PUBLICATIONS

Catt, Consideration about SFN management, Feb. 12-16, 2007, 3GPP TSG RAN WG3 Meeting #55, St. Louis, Missouri, USA, R3-070217, pp. 1-3.*

(Continued)

*Primary Examiner* — Marsha D Banks Harold
*Assistant Examiner* — Hooman Houshmand
(74) *Attorney, Agent, or Firm* — Fay Kaplun & Marcin, LLP

(57) ABSTRACT

A method for determining a single frequency network area, applied to a broadcasting and multicasting technology field, includes: determining a cell or a cell cluster with a terminal subscribing to the broadcast multicast service; determining a cell or a cell cluster without a terminal subscribing to the broadcast and multicast service that is neighboring to the cell or the cell cluster with a terminal subscribing to the broadcast multicast service, as an auxiliary cell or an auxiliary cell cluster; selecting the auxiliary cell or the auxiliary cell cluster that satisfies the predetermined conditions, and determining both the selected auxiliary cell or the auxiliary cell cluster and the cell or the cell cluster with a terminal subscribing to the broadcast and multicast service as a single frequency network area. Also, a device for determining the single frequency network area is provided.

9 Claims, 5 Drawing Sheets

(56) References Cited

U.S. PATENT DOCUMENTS

| | | |
|---|---|---|
| 2004/0131026 A1* | 7/2004 | Kim et al. .................. 370/328 |
| 2005/0070267 A1* | 3/2005 | Vishwanath et al. ....... 455/422.1 |
| 2006/0176936 A1* | 8/2006 | Wang et al. ................ 375/146 |
| 2006/0217067 A1* | 9/2006 | Helbig ....................... 455/63.1 |
| 2007/0161387 A1 | 7/2007 | Roberts |
| 2007/0248068 A1* | 10/2007 | Onggosanusi et al. ...... 370/338 |
| 2008/0025240 A1* | 1/2008 | Casaccia et al. ............. 370/312 |
| 2008/0026715 A1* | 1/2008 | Gao ........................... 455/187.1 |
| 2008/0039084 A1* | 2/2008 | Benveniste et al. .......... 455/434 |
| 2008/0101326 A1* | 5/2008 | Zhang et al. ................. 370/345 |
| 2008/0212546 A1* | 9/2008 | Fischer ....................... 370/338 |
| 2009/0042572 A1* | 2/2009 | Craig et al. .................. 455/436 |

OTHER PUBLICATIONS

Mitsubishi Electric, Semi-static and Dynamic SFN areas for MBMS Services, Oct. 10-13, 2006, 3GPP TSG RAN WG3 Meeting #53bis, Seoul, Korea, R3-061510, pp. 1-4.*

Motorola, SFN areas and the MBMS coordinating function, Aug. 28-Sep. 1, 2006, 3GPP TSG-RAN-WG2 Meeting #54, Tallinn, Estonia, R2-062155, 4 pages.*

Catt, "*Consideration about SFN Management*", Feb. 12-16, 2007, 3GPP TSG RAN WG3 Meeting #55, St. Louis, Missouri, 3 sheets.

* cited by examiner

METHOD AND DEVICE FOR DETERMINING SINGLE FREQUENCY NETWORK AREA

The present application claims the benefit of Chinese Patent Application No. 200710064519.6 filed on Mar. 16, 2007 and entitled "Method and Device for Determining Single Frequency Network Area", contents of which are hereby incorporated in its entirety by reference.

FIELD OF THE INVENTION

The present invention relates to the field of Broadcast Multicast Service (BMS) technology, and particularly to a method and device for determining a single frequency network area in a mobile communication network.

BACKGROUND OF THE INVENTION

The Broadcast Multicast Service technology may be used to enable multiple User Equipments (UEs) to receive service data simultaneously within the range of a service coverage region. Compared with a traditional mobile communication technology in a point-to-point mode, the Broadcast Multicast Service may improve the utilities of network and spectrum resources significantly due to its provision of communication contents for multiple UEs in the service coverage range. In recent years, a technology of providing a wireless Broadcast Multicast Service using a mobile communication system develops fast, and is increasingly merged with a traditional digital audio broadcast technology, a traditional digital video broadcast technology, etc. Currently, the Multimedia Broadcast Multicast Service (MBMS) has been introduced into the 3rd generation mobile communication system defined by the 3rd Generation Partnership Project (3GPP). The MBMS refers to a point-to-multipoint service in which data is sent from one data source to multiple UEs, enabling sharing of core network resources and access network resources, particularly air interface resources. The MBMS defined by the 3GPP may implement high-speed multicast and broadcast of a multimedia service, such as the transmission of a TV service to a mobile UE.

To implement the transmission of multimedia data at a higher speed and a higher quality of service, the existing MBMS technologies are further improved in the 3GPP Long Term Evolution (LTE) plan, and an evolved MBMS (eM-BMS) is proposed. FIG. 1 shows the architecture of the eMBMS, in which an RNC node is removed, and a Radio Resource Controller (RRC) and/or a Radio Link Controller (RLC) and/or a Media Access Controller (MAC) are implemented in an evolved NodeB (eNodeB). Evolved Pocket Cores (EPCs) are used to implement functions of mobility control, service bearer management, etc.

In view of the fact that a path loss and fading occurring in the transmission of a wireless signal may cause a service coverage blind spot and signal reception quality degradation in a coverage region of a wireless base station, especially at the edge of a cell, the concept of Single Frequency Network (SFN) has been proposed, in the development of the Broadcast Multicast Service technology. In the SFN, it is proposed that the same wireless interface signal is transmitted by multiple base stations, and when a UE receives the same signal from the multiple base stations, which are equivalent to multipath propagation signals from the same signal source, the macro diversity overlap coverage by the multiple base stations may be achieved due to independencies of the propagation signals from various paths, and the coverage degree and reception quality of the Broadcast Multicast Service may be significantly improved if a suitable signal processing means is selected.

A method for determining an SFN area in the prior art includes assigning the size of the SFN area based on Broadcast Multicast Service planning. After a certain time period of operation, the size of the SFN area may be reassigned when the Broadcast Multicast Service region is required to be adjusted. In such a method, the SFN area is constant between two assignment of the SFN area size, and the method is static.

However, in the practical wireless network environment, the distribution of UEs subscribing for a particular Broadcast Multicast Service may vary dynamically, and thus the UEs may be present at the edges of some SFN area cells, and cannot make full use of the SFN area because such edges are not covered by the macro diversity, resulting in a degraded reception quality.

SUMMARY OF THE INVENTION

An object of embodiments of the present invention is to provide a method and device for determining a Single Frequency Network area, to determine the Single Frequency Network area.

To achieve the above object, the embodiments of the invention provide the following method and device for determining the Single Frequency Network area.

There is provided a method for determining a Single Frequency Network area, including:

determining a cell or cell cluster in which at least one UE subscribing for a Broadcast Multicast Service is present;

determining a cell or cell cluster which has no UE subscribing for the Broadcast Multicast Service and is neighboring to the cell or cell cluster in which the UE subscribing for the Broadcast Multicast Service is present, as an auxiliary cell or cell cluster; and selecting any of the auxiliary cells or cell clusters that satisfies a preset condition, and determining both the selected auxiliary cells or cell clusters and the determined cell or cell cluster in which the UE subscribing for the Broadcast Multicast Service is present as a Single Frequency Network area.

Determining the cell in which at least one UE subscribing for the Broadcast Multicast Service is present includes:

notifying the UE subscribing for the Broadcast Multicast Service to return acknowledge information, and determining initially all cells as "Available"; and receiving the acknowledge information returned by the UE, setting any cell in which no acknowledge information is returned by the UE as "Null", and determining the remaining cells set as "Available" as the cells having the UE subscribing for the Broadcast Multicast Service; or notifying the UE subscribing for the Broadcast Multicast Service to return acknowledge information, and determining initially all cells as "Null"; and receiving the acknowledge information returned by the UE, setting any cell in which the acknowledge information is returned by the UE as "Available", and determining the cells set as "Available" as the cells having the UE subscribing for the Broadcast Multicast Service.

Determining the cell cluster in which at least one UE subscribing for the Broadcast Multicast Service is present includes:

notifying the UE subscribing for the Broadcast Multicast Service to return acknowledge information, determining initially all cells as "Available", and determining initially all cell clusters as "Available"; and receiving the acknowledge information returned by the UE, setting any cell in which no acknowledge information is returned by the UE as "Null", setting the cell cluster as "Null" if all cells in the cell cluster are set as "Null", and determining the remaining cell clusters set as "Available" as the cell clusters having the UE subscribing for the Broadcast Multicast Service; or notifying the UE subscribing for the Broadcast Multicast Service to return acknowledge information, determining initially all cells as "Null", and determining initially all cell clusters as "Null"; and receiving the acknowledge information returned by the UE, setting a cell in which no acknowledge information is returned by the UE as "Available", setting the cell cluster as "Available" if all cells in the cell cluster are set as "Null", and determining the cell clusters set as "Available" as the cell clusters having the UE subscribing for the Broadcast Multicast Service.

Notifying the UE subscribing for the Broadcast Multicast Service to return the acknowledge information includes:

notifying the UE subscribing for the Broadcast Multicast Service to return the acknowledge information using an access probability factor.

Determining any cell or cell cluster which has no UE subscribing for the Broadcast Multicast Service and is neighboring to the cell or cell cluster in which the UE subscribing for the Broadcast Multicast Service is present includes:

determining a first set consist of all cells or cell clusters that are neighboring to the cells or cell clusters having the UE subscribing for the Broadcast Multicast Service, and subtracting a second set consist of the cells or cell clusters having the UE subscribing for the Broadcast Multicast Service from the first set.

Selecting any of the auxiliary cells or cell clusters that satisfies a preset condition includes:

selecting any of the auxiliary cells or cell clusters so that neighboring cells or cell clusters of the selected auxiliary cell or cell cluster include cells or cell clusters that have the UE subscribing for the Broadcast Multicast Service and have a number no less than the preset threshold value.

Selecting any of the auxiliary cells or cell clusters that satisfies a preset condition further includes:

selecting, from the neighboring cells of the cell in which the acknowledge information is returned by the UE, any of the auxiliary cells or cell clusters if the strength of a pilot signal in the auxiliary cell or cell cluster is larger than a threshold value.

The threshold value may be the receiving signal strength of a pilot channel in the cell where the UE is currently located.

If the threshold value is equal to 1, selecting any of the auxiliary cells or cell clusters includes:

selecting all of the cells or cell clusters.

There is provided a device for determining a Single Frequency Network area, including: a Broadcast Multicast Service related cell or cell cluster determining unit 910, an auxiliary cell or cell cluster determining unit 920, and a Single Frequency Network area determining unit 930.

The Broadcast Multicast Service related cell or cell cluster determining unit 910 is adapted to determine any cell or cell cluster in which at least one UE subscribing for the Broadcast Multicast Service is present.

The auxiliary cell or cell cluster determining unit 920 is adapted to determine any cell or cell cluster that has no UE subscribing for the Broadcast Multicast Service and is neighboring to the cell or cell cluster having the UE subscribing for the Broadcast Multicast Service.

The Single Frequency Network area determining unit 930 is adapted to determine both the cells or cell clusters determined by the Broadcast Multicast Service related cell or cell cluster determining unit 910 and any of the auxiliary cells or cell clusters determined by the auxiliary cell or cell cluster determining unit 920 that satisfies predetermined conditions as the Single Frequency Network area.

The Broadcast Multicast Service related cell or cell cluster determining unit 910 includes a return acknowledge information notifying unit 911, an initialization unit 912, and a reception and statistics unit 913.

In the case of the cell, the return acknowledge information notifying unit 911 is adapted to notify the UE subscribing for the Broadcast Multicast Service to return acknowledge information.

In the case of the cell, the initialization unit 912 is adapted to determine initially all cells as "Available", or determine initially all cells as "Null".

In the case of the cell, the reception and statistics unit 913 is adapted to receive the acknowledge information returned by the UE, and after the processing by the initialization unit 912, set a cell in which the acknowledge information is returned from the UE as "Available", and determine such cells set as "Available" as the cells having the UE subscribing for the Broadcast Multicast Service; or, receive the acknowledge information returned by the UE, set any cell in which the acknowledge information is returned from the UE as "Available", and determine such cells set as "Available" as the cells having the UE subscribing for the Broadcast Multicast Service.

In the case of the cell cluster, the return acknowledge information notifying unit 911 is adapted to notify the UE subscribing for the Broadcast Multicast Service to return acknowledge information.

In the case of the cell cluster, the initialization unit 912 is adapted to determine initially all cells as "Available" and determine initially all cell clusters as "Available"; or determine initially all cells as "Null" and determine initially all cell clusters as "Null".

In the case of the cell cluster, the reception and statistics unit 913 is adapted to receive the acknowledge information returned by the UE, and after the processing by the initialization unit 912, set any cell in which no acknowledge information is returned from the UE as "Null", set a cell cluster as "Null" if all cells in the cell cluster are set as "Null", and determine the cell cluster set as "Available" as the cell cluster having the UE subscribing for the Broadcast Multicast Service; or, set any cell in which no acknowledge information is returned from the UE as "Available", set a cell cluster as "Available" if all cells in the cell cluster are set as "Null", and determine such cell clusters set as "Available" as the cell clusters having the UE subscribing for the Broadcast Multicast Service.

The auxiliary cell or cell cluster determining unit 920 includes a neighboring cell or cell cluster determining unit 921, and a set subtracting unit 922.

The neighboring cell or cell cluster determining unit 921 is adapted to determine all cells or cell clusters neighboring to each cell or cell cluster determined by the Broadcast Multicast Service related cell or cell cluster determining unit 910.

The set subtracting unit 922 is adapted to subtract a set consist of the cells or cell clusters determined by the Broadcast Multicast Service related cell or cell cluster determining unit 910 from a set consist of neighboring cells or cell clusters determined by the neighboring cell or cell cluster determining unit 921, so that the auxiliary cells or cell clusters are obtained as a result of the subtraction.

The Single Frequency Network area determining unit 930 includes a threshold value setting unit 931, an auxiliary cell or cell cluster conditionally selecting unit 932, and a configuration unit 933.

The threshold value setting unit 931 is adapted to set a threshold value in advance.

The auxiliary cell or cell cluster conditionally selecting unit 932 is adapted to select any of the auxiliary cells or cell clusters so that neighboring cells or cell clusters of the selected auxiliary cell or cell cluster include cells or cell clusters that have at least one UE subscribing for the Broadcast Multicast Service and have a number no less than a threshold value.

The configuration unit 933 is adapted to configure both the cells or cell clusters determined by the Broadcast Multicast Service related cell or cell cluster determining unit 910 and the auxiliary cells or cell clusters selected by the auxiliary cell or cell cluster conditionally selecting unit 932 as the Single Frequency Network area.

In the above solutions according to embodiments of the present invention, the cells or cell clusters having the UE subscribing for the Broadcast Multicast Service are determined, cells or cell clusters neighboring to the determined cells or cell clusters are determined as the auxiliary cells or cell clusters, and both any of the auxiliary cells or cell clusters that satisfies the preset conditions and the determined cells or cell clusters having the UE subscribing for the Broadcast Multicast Service are configured as the Single Frequency Network area, so that a UE located at the edge of a cell or cell cluster may obtain the macro diversity gain using the least auxiliary cells or cell clusters, and thus a high reception quality of the UE may be ensured.

BRIEF DESCRIPTION OF THE DRAWINGS

FIGS. 8-1 and 8-2 show an effect of dynamic configuration using the method according to an embodiment of the present invention with Kb being equal to 1 and 2, respectively.

DETAILED DESCRIPTION OF THE EMBODIMENTS

An embodiment of the present invention provides a method for configuring a Single Frequency Network area, and the method includes: determining a cell or cell cluster in which at least one UE subscribing for an eMBMS is present; determining a cell or cell cluster which has no UE subscribing for the Broadcast Multicast Service and is neighboring to the cell or cell cluster in which the UE subscribing for the eMBMS is present, as an auxiliary cell or cell cluster; and determining both any of the auxiliary cells or cell clusters that satisfies a preset condition and the determined cell or cell cluster in which the UE subscribing for the eMBMS is present as a Single Frequency Network area.

The present embodiment is described below by way of an example of the eMBMS technology standards defined by the 3GPP LTE project. The concept of the SFN in the network technology field is introduced to the eMBMS based on the fact that the eMBMS is carried over a High-Speed Physical Downlink Channel. A set of cells in which the eMBMS is implemented through the SFN constructs an SFN area. Particularly, the SFN area is defined in the protocol as follows.

An SFN area includes a set of cells covered continuously, which employ the same wireless resources within the same frequency band and transmit the eMBMS simultaneously at the same time. The SFN area is consist of cells involved in the transmission of the eMBMS.

Cells in the SFN area are in synchronization, including node synchronization, content synchronization and air interface synchronization. In this case, a UE at the edge of a cell in the SFN area may receive a synchronized signal from another cell in the SFN area, thereby obtaining a downlink macro diversity gain.

In consideration of the region to be covered by the eMBMS and the number and distribution of cells that may be in synchronization, the SFN area includes a limited range of cells. Accordingly, the maximum range of cells is referred to as a Maximum SFN area. In the Maximum SFN area, the size of the SFN area is configurable.

Figure 2:
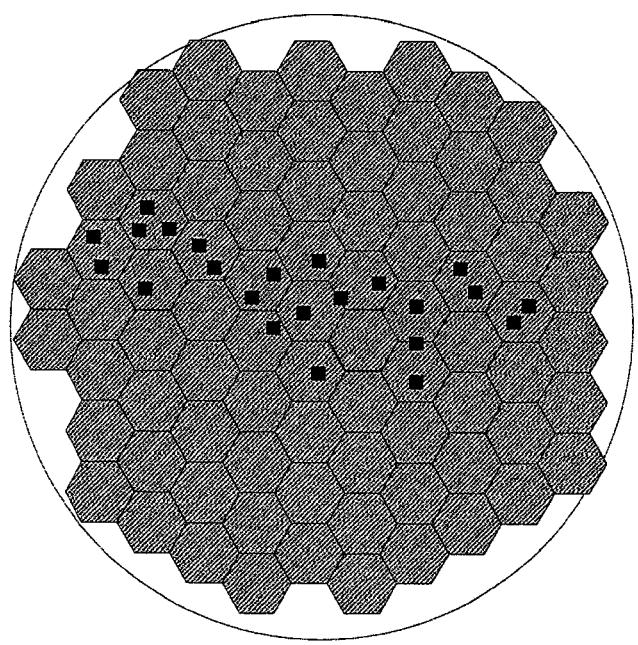
FIG. 2 is a schematic diagram showing effect of static configuration of a Single Frequency Network in the prior art.

In the existing method for statically configuring an SFN area, a sufficient redundancy is necessary to be introduced from the perspective of network planning, resulting in an increased range of the SFN area. FIG. 2 is a schematic diagram showing an effect of statically configuring an SFN in the prior art. It is uneconomical to transmit Broadcast Multicast Service contents through SFN coverage provided by all base stations within a fixed large range of geographic regions, in this case, unwanted interference may be caused in the entire network, and the utilization of frequency spectrum resources may be degraded.

For better understanding of solutions in embodiments of the present invention by those skilled in the art, the embodiments of the invention are described in detail below with reference to the accompanying drawings.

In the prior art, UEs subscribing for an eMBMS are determined before the transmission of the eMBMS to obtain the number of the UEs subscribing for the eMBMS, in order to determine a wireless bearing mode used to transmit the eMBMS according to the obtained number. The range of UEs determined is within the range of the Maximum SFN area.

The UEs subscribing for the eMBMS may be notified via a paging channel or a broadcast channel by each cell to return acknowledge information, according to which the number of the UEs subscribing for the eMBMS may be calculated. During the transmission of the eMBMS, the number of UEs subscribing for the eMBMS may be recalculated to determine whether the current wireless bearing mode is the optimal, and change the current wireless bearing mode if it is not the optimal. During such a process, an uplink Random Access Channel is typically used by the UEs subscribing for the eMBMS to return the acknowledge information. To avoid congestion of the uplink Random Access Channel due to messages returned simultaneously by excessive UEs, the number of UEs returning the acknowledge information is controlled by using an access probability factor when the notification is sent out. That is, the UEs partially return the acknowledge information according to the access probability factor, and the number of the UEs subscribing for the eMBMS is calculated according to the access probability factor and the number of UEs that have returned the acknowledge information.

In the invention, a method similar to the statistic process above is used to determine the range of the SFN area.

Figure 3:
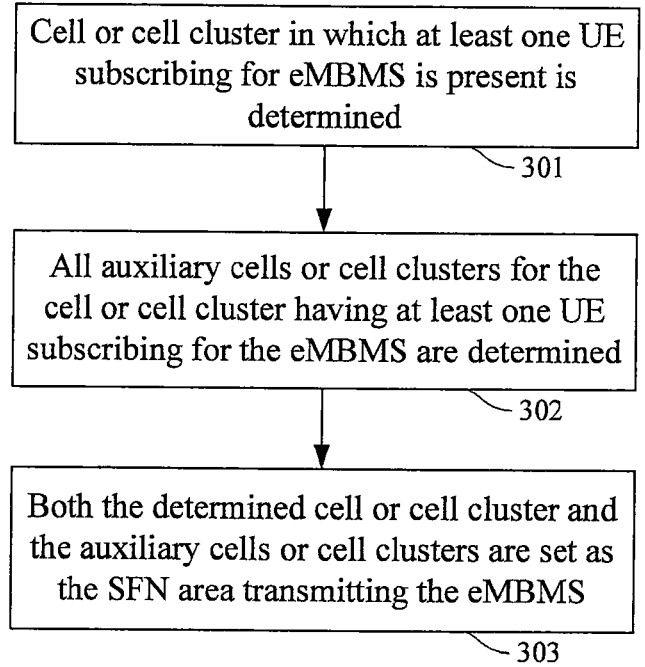
FIG. 3 is a flow chart of a method according to an embodiment of the present invention.

FIG. 3 is a flow chart showing the method according to an embodiment of the present invention, and the method includes as follows.

Process 301: A cell or cell cluster in which at least one UE subscribing for the eMBMS is present is determined.

The forgoing has mentioned the method for calculating the number of the UEs subscribing for the eMBMS in the prior art, based on which the number of cells having the UEs subscribing for the eMBMS (i.e. cells in which the UEs subscribing for the eMBMS are present) may be calculated.

The determined cells having the UEs subscribing for the eMBMS are within the Maximum SFN area. It will be appreciated that an operator may predefine a statistic operation area, which is a subset of the Maximum SFN area. The size of the statistic operation area may be set depending on practical requirements, and the number of cells having the UEs subscribing for the eMBMS is calculated within the statistic operation area.

The function of eMBMS transmission is required to be activated in a cell in which the UEs subscribing for the eMBMS are present. Therefore, any cell in which the acknowledge information is returned from a UE during the determination process is set as "Available", and any cell in which no acknowledge information is returned from a UE is set as "Null" based on the result of determining the UEs subscribing for the eMBMS.

Figure 4:
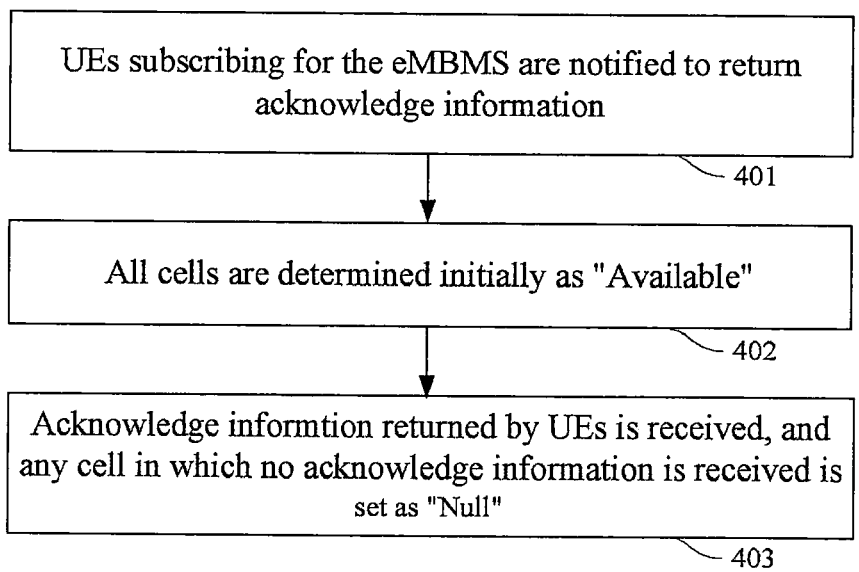
FIG. 4 is a flow chart showing a process of determining a cell in which at least one UE subscribing for the evolved MBMS is present in the method according to an embodiment of the present invention.

A particular implementation of Process 301 is shown in FIG. 4, in which:

Process 401: UEs subscribing for the eMBMS are notified to return acknowledge information.

Process 402: All cells are determined initially as "Available".

It will be appreciated that all cells may be determined initially as "Null" in Process 402.

Further, the order of Processes 401 and 402 is not limited.

Process 403: Acknowledge information returned by UEs is received, and a cell in which no acknowledge information is received is set as "Null".

The resulting cells set as "Available" are determined as the cells having the UEs subscribing for the eMBMS.

Accordingly, if all cells are determined initially as "Null" in Process 402, any cell in which the acknowledge information is received is set as "Available" in Process 403.

However, considering the fact that the macro diversity is required to be enabled at the edge of those cells set as "Available" to ensure that any UE at the edge may receive the eMBMS, the functions of eMBMS transmission in all the cells set as "Null" are not deactivated, that is, the functions of eMBMS transmission in some of the cells set as "Null" are activated conditionally in the subsequent process.

Some cells may be combined into a cell cluster for managing. For example, cells belonging to an eNodeB may be characterized by sharing common transmission resources and may be combined into a cell cluster for managing. The cell cluster may be a set of one or more continuous cells, which are preset by the operator according to the practical requirements.

Since all cells in a cell cluster are managed in the same manner, the function of eMBMS transmission of all the cells in the cell cluster is activated or deactivated according to a statistical result of the cell cluster. The cell cluster is determined as "Available" if any one of its cells is set as "Available", and determined as "Null" if all of its cells are set as "Null".

Figure 5:
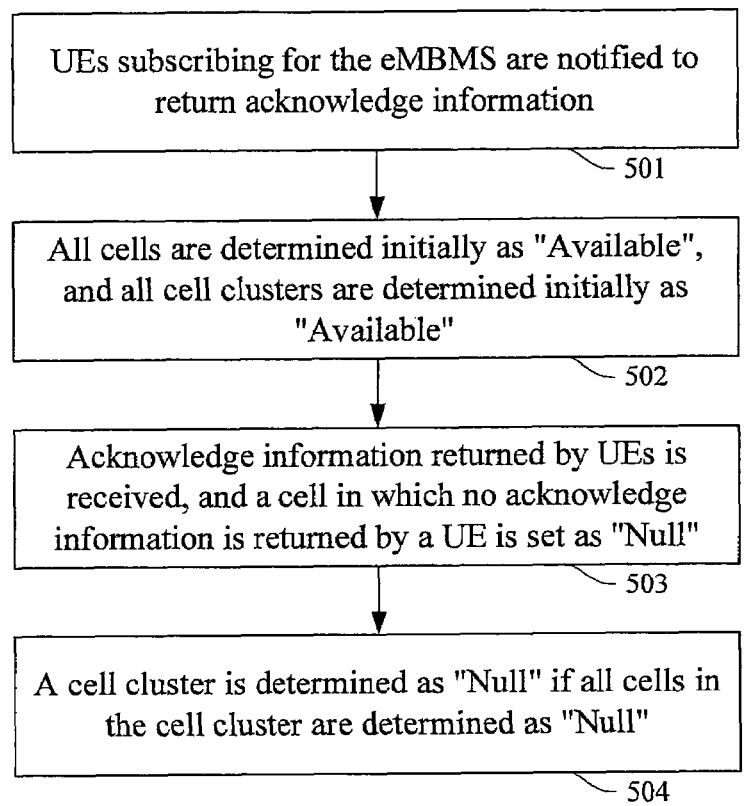
FIG. 5 is a flow chart showing a process of determining a cell cluster in which at least one UE subscribing for the evolved MBMS is present in the method according to an embodiment of the present invention.

A flow chart of determining a cell cluster as "Available" or "Null" is shown in FIG. 5.

Process 501: UEs subscribing for the eMBMS are notified to return acknowledge information.

Process 502: All cells are determined initially as "Available", and all cell clusters are determined initially as "Available".

Likewise, the order of Processes 501 and 502 is not limited.

Process 503: Acknowledge information returned by UEs is received, and a cell in which no acknowledge information is returned by a UE is set as "Null".

Process 504: A cell cluster is determined as "Null" if all cells in the cell cluster are determined as "Null".

Finally, the cell clusters determined as "Available" are those having UEs subscribing for the eMBMS.

In Process 502, it is also possible to determine initially all cells as "Null", and determine initially all cell clusters as "Null". In this case, any cell in which the acknowledge information is returned by a UE is determined as "Available" in Process 503, and a cell cluster is determined as "Available" if any one of cells in the cell cluster is determined as "Available" in Process 504.

Likewise, considering the fact that the macro diversity is required to be enabled at the edge of such cell clusters determined as "Available" to ensure that any UE at the edge may receive the eMBMS, the functions of eMBMS transmission in all the cell clusters set as "Null" are not deactivated, that is, the functions of eMBMS transmission in some of the cell clusters set as "Null" are activated conditionally in the subsequent process.

In particular, Processes 501 to 504 may be simplified as Processes 401 to 403 if the cell cluster in Processes 501 to 504 includes a single cell.

In above Processes 401 to 403 and Processes 501 to 504, the UEs subscribing for the eMBMS may be notified to return the acknowledge information using an access probability factor, as described above, and then the number of the UEs subscribing for the eMBMS may be calculated according to the access probability factor and the number of UEs returning the acknowledge information.

Considering the requirement for ensuring that a UE at the edge of the cell or cell cluster may obtain a macro diversity gain, attention is paid to the cases of "Hole" and "Isolated island" below when the function of eMBMS transmission is activated or deactivated subsequently with reference to the definition of continuity of the SFN area.

Figure 6:
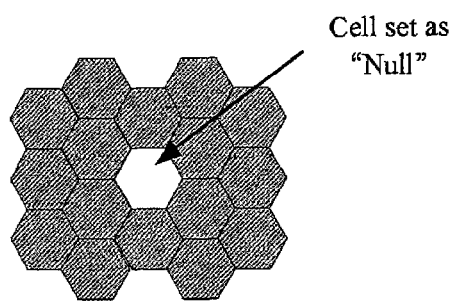
FIG. 6 is a schematic diagram showing a hole according to an embodiment of the present invention.

FIG. 6 shown the case of a "Hole". As shown in FIG. 6, whether the function of eMBMS transmission of a cell determined as "Null" is deactivated depends on the state (e.g. activated or deactivated) of the eMBMS transmission function of cells neighboring to the cell determined as "Null". In the case of the "Hole" as shown in FIG. 6, i.e. the case where cells neighboring to the cell determined as "Null" are determined as "Available", the "Hole" cell is required to activate its function of eMBMS transmission.

Figure 7:
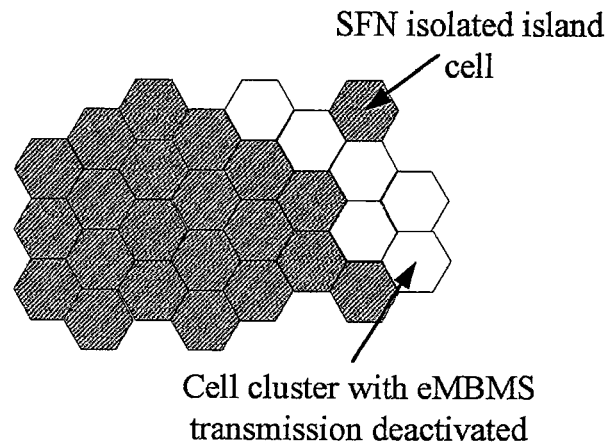
FIG. 7 is a schematic diagram showing an isolated island according to an embodiment of the present invention.

FIG. 7 shows the case of an "Isolated island". As shown, if cells neighboring to a cell determined as "Available" are determined as "Null", the activation of the eMBMS transmission function of the cell determined as "Available" alone is insufficient for obtaining a macro diversity gain, and thus the cells neighboring to the cell determined as "Null" are required to activate their function of eMBMS transmission.

As shown in the cases of the "Hole" and "Isolated island" above, whether the eMBMS transmission function of a cell within an SFN area is activated depends on the state (e.g. activated or deactivated) of the eMBMS transmission function of cells neighboring to the cell. The eMBMS transmission function of a cell is required to be activated if the eMBMS transmission function of all of its neighboring cells is activated. To this end, the implementation of Processes 302 and 303 is provided.

Process 302: All auxiliary cells or cell clusters for a cell or cell cluster having at least one UE subscribing for the eMBMS are determined.

For each cell, its neighboring cells are typically determined in network planning, and mapping relationships between the cell and its neighboring cells are established using cell identifiers to form a neighboring cell list. The neighboring cell list of a cell indicates cells whose coverage ranges are neighboring to that of the cell. The actual neighboring cell list of a cell may be different from that of another cell, and obtained through analysis and measurement on wireless signal strength in the coverage region of the cell. The neighboring cell list is used for determining a target cell in a switching algorithm in the prior art. In the invention, the neighboring cell list is also introduced into the method for determining the SFN area. That is, mapping relationships between each cell cluster and its neighboring cell clusters are established in advance during the network planning and stored in a device for determining the SFN area. Each cell cluster may include multiple cells, and if each cell cluster includes a single cell, the cell cluster mapping relationships are equivalent to the neighboring cell list for the purpose of switching. By optimizing the mapping relationships with neighboring cell clusters, the calculation overhead for determining auxiliary cells may be reduced.

All of the cells or cell clusters obtained in Process 301 above constitute a first set, their neighboring cells or cell clusters constitute a second set having a larger range, and all the auxiliary cells or cell clusters required in the present Process 302 may be obtained by subtracting the first set from the second set, as described in detail below.

Any cell or cell cluster having at least one UE subscribing for the eMBMS may be denoted as A-type cell or cell cluster, the eMBMS transmission function of which is always activated; and other cells or cell clusters are denoted as B-type cells or cell clusters, which are processed subsequently and among which the auxiliary cells or cell clusters are selected.

Assuming that all A-type cells or cell clusters constitute a set A', cells in which are denoted as $a_1, a_2, \ldots, a_n$, respectively. A set of neighboring cells of a cell $a_i$ is obtained and denoted as $X_i$, where $i=1, 2, \ldots, n$.

A set C may be obtained by subtracting set A' from all the $X_i$, i.e.

$$\bigcup_{i=1}^{n} X_i - A'.$$

The set C includes all the auxiliary cells or cell clusters of the cell or cell cluster having at least one UE subscribing for the eMBMS.

Process 303: The determined cell or cell cluster and the auxiliary cells or cell clusters are set as the SFN area transmitting the eMBMS.

As described above, the eMBMS transmission function of the cells or cell clusters in the set A' are always activated. Since the set C obtained in Process 302 surrounds the set A', the eMBMS transmission function of the cells or cell clusters in the set C are also required to be activated, in order to ensure the downlink macro diversity gain at the edge of cells included in the set A'.

Finally, the eMBMS is transmitted in the cells or cell clusters within the sets A' and set C.

Figure 1:
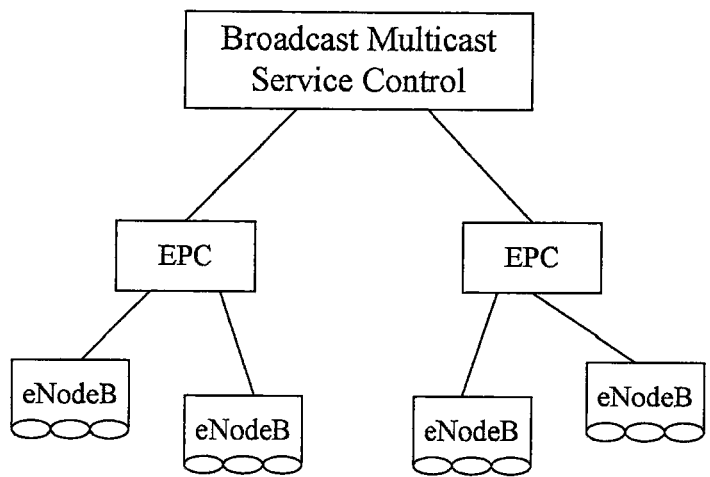
FIG. 1 is a diagram showing an evolved MBMS architecture in the prior art.
Figures 1, 8:
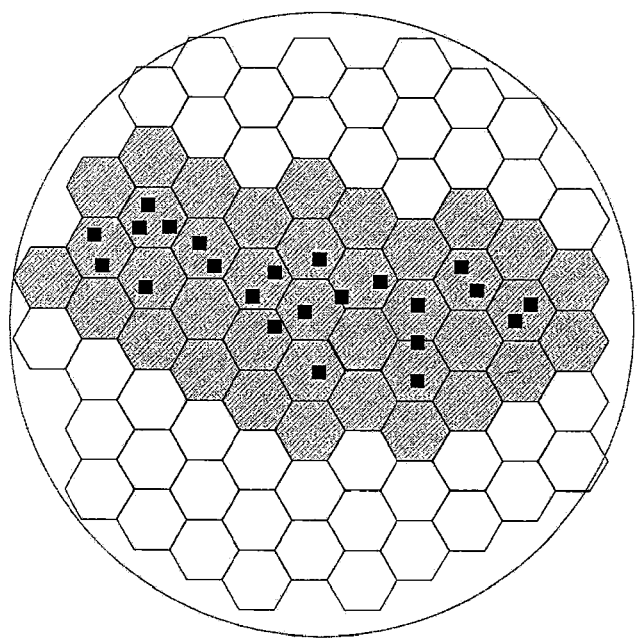
Figures 2, 8:
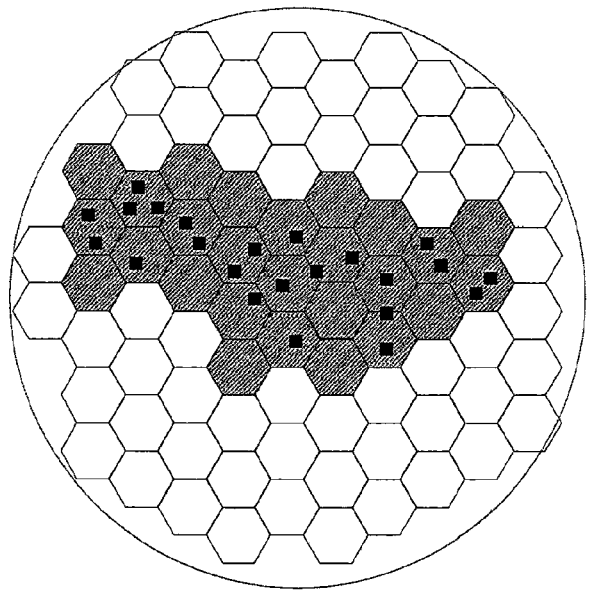

To activate the eMBMS transmission function of the cells or cell clusters within the set C, transmission power is required to be taken into consideration. Alternatively, the eMBMS transmission function is conditionally activated considering some other factors, in this case, a threshold value Kb may be provided, and the eMBMS transmission function of a cell c in the set C is activated if Kb or more cells of the neighboring cells of the cell c belong to the set A'. The case where Kb is equal to 1, which is shown in FIG. 8-1, is equivalent to the above-described case where the determined cell or cell cluster and the auxiliary cells or cell clusters are set as the SFN area transmitting the eMBMS. When Kb is larger than 1, for example, when Kb is equal to 2, the eMBMS transmission function of any cell in the set C is activated if 2 or more cells of the neighboring cells of the cell belong to the set A'. The case where Kb equal to 2 is shown in FIG. 8-2.

When Kb is equal to 2 or more than 2, if a UE is located at the edge of a cell d, with a cell c being neighboring to the edge of the cell d, the eMBMS transmission function of the cell d being activated, the cell e belonging to the set C, and only the cell d among the neighboring cells of the cell e belonging to the set A', then the eMBMS transmission function of the cell e is deactivated according to the above method. However, if the UE detects a signal with a high strength from the cell e, the activation of the eMBMS transmission function of the cell e is advantageous for the UE to obtain a macro diversity gain at the edge of the cell d. In the known SFN technologies, an activated UE reports its detected co-frequency signal to the network side. In this case, at the network side, if the strength of a pilot signal of a neighbor cell belonging to the set C reported by the UE is larger than a threshold value, the eMBMS transmission function of the neighboring cell may be activated. The threshold value may be predefined, for example, the threshold value may be the receiving signal strength of a pilot channel of the cell where the UE is currently located, or the signal strength of the neighboring cell upon switching that is preset in the network, or other value. If the cell e above belongs to a cell cluster, the eMBMS transmission function of the cell cluster is activated.

As can be seen, the default value of the threshold value Kb may be set as 1, and the threshold value Kb may be varied if desired. When being larger than 1, the threshold value Kb may be further modified according to signal strength of a neighboring cell belonging to the set C.

With the use of the above method according to the embodiment of the invention, the cell or cell cluster having the UE subscribing for the eMBMS is determined, auxiliary cells or cell clusters are obtained after determining all neighboring cells or cell clusters of the determined cell or cell cluster, and auxiliary cells or cell clusters satisfying the predetermined conditions and the determined cell or cell cluster may be configured as the Single Frequency Network area, so that the Single Frequency Network area may be configured dynamically, and a UE located at the edge of a cell or cell cluster may obtain the macro diversity gain using the least auxiliary cells or cell clusters, and thus a high reception quality of the UE may be ensured and the wireless resources and transmission resources may be saved.

A device according to an embodiment of the present invention is described below. A block diagram showing the device according to the embodiment is shown in FIG. 9.

Figure 9:
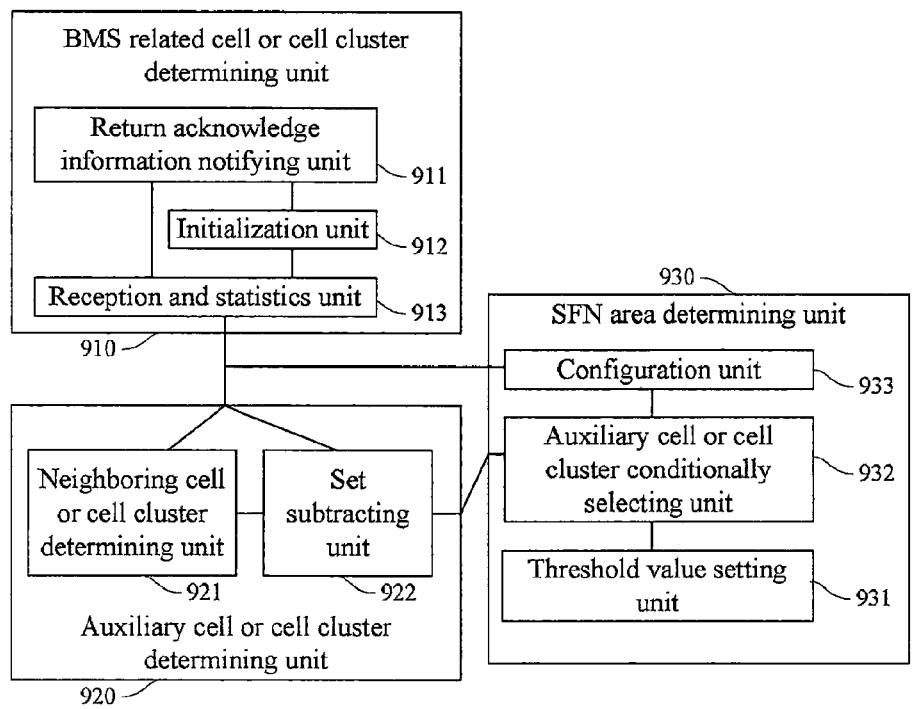
FIG. 9 is a block diagram showing a device according to an embodiment of the present invention.

The device for determining a Single Frequency Network area as shown in FIG. 9 includes a Broadcast Multicast Service related cell or cell cluster determining unit 910, an auxiliary cell or cell cluster determining unit 920, and a Single Frequency Network area determining unit 930.

The Broadcast Multicast Service related cell or cell cluster determining unit 910 is adapted to determine any cell or cell cluster in which at least one UE subscribing for the Broadcast Multicast Service is present.

The auxiliary cell or cell cluster determining unit 920 is adapted to determine any cell or cell cluster that has no UE subscribing for the Broadcast Multicast Service and is neighboring to the cell or cell cluster having the UE subscribing for the Broadcast Multicast Service.

The Single Frequency Network area determining unit 930 is adapted to determine both the cells or cell clusters determined by the Broadcast Multicast Service related cell or cell cluster determining unit 910 and any of the auxiliary cells or cell clusters determined by the auxiliary cell or cell cluster determining unit 920 that satisfies the predetermined conditions as the Single Frequency Network area.

The Broadcast Multicast Service related cell or cell cluster determining unit 910 includes a return acknowledge information notifying unit 911, an initialization unit 912, and a reception and statistics unit 913.

In the case of cell, the return acknowledge information notifying unit 911 is adapted to notify a UE subscribing for the Broadcast Multicast Service to return acknowledge information.

In the case of cell, the initialization unit 912 is adapted to determine initially all cells as "Available", or determine initially all cells as "Null".

In the case of cell, the reception and statistics unit 913 is adapted to receive the acknowledge information returned by the UE, and after the processing by the initialization unit 912, set any cell in which the acknowledge information is returned from the UE as "Available", and determine such cells set as "Available" as the cells having the UE subscribing for the Broadcast Multicast Service; or, receive the acknowledge information returned by the UE, set any cell in which the acknowledge information is returned from the UE as "Available", and determine such cells set as "Available" as the cells having the UE subscribing for the Broadcast Multicast Service.

In the case of cell cluster, the return acknowledge information notifying unit 911 is adapted to notify a UE subscribing for the Broadcast Multicast Service to return acknowledge information.

In the case of cell cluster, the initialization unit 912 is adapted to determine initially all cells as "Available" and determine initially all cell clusters as "Available"; or determine initially all cells as "Null" and determine initially all cell clusters as "Null".

In the case of cell cluster, the reception and statistics unit 913 is adapted to receive the acknowledge information returned by the UE, and after the processing by the initialization unit 912, set any cell in which no acknowledge information is returned from the UE as "Null", set a cell cluster as "Null" if all cells in the cell cluster are set as "Null", and determine the cell cluster still set as "Available" as the cell cluster having the UE subscribing for the Broadcast Multicast Service; or, set any cell in which no acknowledge information is returned from the UE as "Available", set a cell cluster as "Available" if all cells in the cell cluster are set as "Null", and determine such cell clusters set as "Available" as the cell clusters having the UE subscribing for the Broadcast Multicast Service.

The auxiliary cell or cell cluster determining unit 920 includes a neighboring cell or cell cluster determining unit 921, and a set subtracting unit 922.

The neighboring cell or cell cluster determining unit 921 is adapted to determine all cells or cell clusters neighboring to each cell or cell cluster determined by the Broadcast Multicast Service related cell or cell cluster determining unit 910.

The set subtracting unit 922 is adapted to subtract a set consist of cells or cell clusters determined by the Broadcast Multicast Service related cell or cell cluster determining unit 910 from a set consist of neighboring cells or cell clusters determined by the neighboring cell or cell cluster determining unit 921, so that the auxiliary cells or cell clusters are obtained as a result of the subtraction.

The Single Frequency Network area determining unit 930 includes a threshold value setting unit 931, an auxiliary cell or cell cluster conditionally selecting unit 932, and a configuration unit 933.

The threshold value setting unit 931 is adapted to set a threshold value in advance.

The auxiliary cell or cell cluster conditionally selecting unit 932 is adapted to select any of the auxiliary cells or cell clusters, whose neighboring cells or cell clusters include cells or cell clusters that have at least one UE subscribing for the Broadcast Multicast Service and have a number no less than the threshold value.

The configuration unit 933 is adapted to configure both the cells or cell clusters determined by the Broadcast Multicast Service related cell or cell cluster determining unit 910 and the auxiliary cells or cell clusters selected by the auxiliary cell or cell cluster conditionally selecting unit 932 as the Single Frequency Network area.

The approach of configuring dynamically the SFN area using the device according to the embodiment of the invention is similar to that described above, and detailed description thereof is omitted herein.

The invention claimed is:

1. A method for determining a Single Frequency Network area, comprising:
   determining a cell or cell cluster in which at least one User Equipment subscribing for a Broadcast Multicast Service is present;
   determining any cell or cell cluster which has no User Equipment subscribing for the Broadcast Multicast Service and is neighboring to the cell or cell cluster in which the User Equipment subscribing for the Broadcast Multicast Service is present, as an auxiliary cell or cell cluster; and
   selecting any of the auxiliary cells or cell clusters that satisfies a preset condition, and determining both the selected auxiliary cells or cell clusters and the determined cell or cell cluster in which the User Equipment subscribing for the Broadcast Multicast Service is present as a Single Frequency Network area;
   wherein selecting any of the auxiliary cells or cell clusters that satisfies a preset condition comprises:
   selecting any of the auxiliary cells or cell clusters so that neighboring cells or cell clusters of the selected auxiliary cell or cell cluster comprise cells or cell cluster that have the User Equipment subscribing for the Broadcast Multicast Service and have a number no less than a present threshold value,
   and wherein the preset threshold value is equal to or more than 2, the method further comprises:
   selecting any of the auxiliary cells or cell clusters if the strength of a pilot signal in the auxiliary cell or cell cluster is larger than a further threshold value.

2. The method of claim 1, wherein determining the cell in which at least one User Equipment subscribing for the Broadcast Multicast Service is present comprises:

notifying the User Equipment subscribing for the Broadcast Multicast Service to return acknowledge information, and determining initially all cells as "Available"; and receiving the acknowledge information returned by the User Equipment, setting a cell in which no acknowledge information is returned by the User Equipment as "Null", and determining the remaining cells set as "Available" as the cells having the User Equipment subscribing for the Broadcast Multicast Service;

or, notifying the User Equipment subscribing for the Broadcast Multicast Service to return acknowledge information, and determining initially all cells as "Null"; and receiving the acknowledge information returned by the User Equipment, setting any cell in which the acknowledge information is returned by the User Equipment as "Available", and determining the cells set as "Available" as the cells having the User Equipment subscribing for the Broadcast Multicast Service.

3. The method of claim 2, wherein notifying the User Equipment subscribing for the Broadcast Multicast Service to return the acknowledge information comprises:

notifying the User Equipment subscribing for the Broadcast Multicast Service to return the acknowledge information using an access probability factor.

4. The method of claim 1, wherein determining the cell cluster in which at least one User Equipment subscribing for the Broadcast Multicast Service is present comprises:

notifying the User Equipment subscribing for the Broadcast Multicast Service to return acknowledge information, determining initially all cells as "Available", and determining initially all cell clusters as "Available"; and receiving the acknowledge information returned by the User Equipment, setting a cell in which no acknowledge information is returned by the User Equipment as "Null", setting the cell cluster as "Null" if all cells in the cell cluster are set as "Null", and determining the remaining cell clusters set as "Available" as the cell clusters having the User Equipment subscribing for the Broadcast Multicast Service;

or, notifying the User Equipment subscribing for the Broadcast Multicast Service to return acknowledge information, determining initially all cells as "Null", and determining initially all cell clusters as "Null";

receiving the acknowledge information returned by the User Equipment, setting any cell in which no acknowledge information is returned by the User Equipment as "Available", setting the cell cluster as "Available" if all cells in the cell cluster are set as "Null", and determining the cell clusters set as "Available" as the cell clusters having the User Equipment subscribing for the Broadcast Multicast Service.

5. The method of claim 4, wherein notifying the User Equipment subscribing for the Broadcast Multicast Service to return the acknowledge information comprises:

notifying the User Equipment subscribing for the Broadcast Multicast Service to return the acknowledge information using an access probability factor.

6. The method of claim 1, wherein determining a cell or cell cluster which has no User Equipment subscribing for the Broadcast Multicast Service and is neighboring to the cell or cell cluster in which the User Equipment subscribing for the Broadcast Multicast Service is present comprises:

determining a first set consist of all cells or cell clusters that are neighboring to the cells or cell clusters having the User Equipment subscribing for the Broadcast Multicast Service, and subtracting a second set consist of the cells or cell clusters having the User Equipment subscribing for the Broadcast Multicast Service from the first set.

7. A device for determining a Single Frequency Network area, comprising:

a Broadcast Multicast Service related cell or cell cluster determining unit, an auxiliary cell or cell cluster determining unit, and a Single Frequency Network area determining unit, wherein:

the Broadcast Multicast Service related cell or cell cluster determining unit is adapted to determine a cell or cell cluster in which at least one User Equipment subscribing for the Broadcast Multicast Service is present;

the auxiliary cell or cell cluster determining unit is adapted to determine a cell or cell cluster that has no User Equipment subscribing for the Broadcast Multicast Service and is neighboring to the cell or cell cluster having the User Equipment subscribing for the Broadcast Multicast Service; and the Single Frequency Network area determining unit is adapted to determine both the cells or cell clusters determined by the Broadcast Multicast Service related cell or cell cluster determining unit and any of the auxiliary cells or cell clusters determined by the auxiliary cell or cell cluster determining unit that satisfies predetermined conditions, as the Single Frequency Network area;

wherein the Single Frequency Network area determining unit comprises a threshold value setting unit, an auxiliary cell or cell cluster conditionally selecting unit, and a configuration unit, wherein the threshold value setting unit is adapted to set a threshold value in advance, wherein the threshold value is equal to or more than 2;

the auxiliary cell or cell cluster conditionally selecting unit is adapted to select any of the auxiliary cells or cell clusters so that neighboring cells or cell clusters of the selected auxiliary cell or cell cluster comprise cells or cells clusters that have at least one User Equipment subscribing for the Broadcast Multicast Service and have a number no less than the threshold value, and select any of the auxiliary cells or cell clusters if the strength of a pilot signal in the auxiliary cell or cell cluster is larger than a further threshold value; and the configuration unit is adapted to configure both the cells or cell clusters determined by the Broadcast Multicast Service related cell or cell cluster determining unit and the auxiliary cells or cell clusters selected by the auxiliary cell or cell cluster conditionally selecting unit as the Single Frequency Network area.

8. The device of claim 7, wherein the Broadcast Multicast Service related cell or cell cluster determining unit comprises a return acknowledge information notifying unit, an initialization unit, and a reception and statistics unit, wherein, in the case of the cell:

the return acknowledge information notifying unit is adapted to notify the User Equipment subscribing for the Broadcast Multicast Service to return acknowledge information;

the initialization unit is adapted to determine initially all cells as "Available", or determine initially all cells as "Null"; and the reception and statistics unit is adapted to receive the acknowledge information returned by the User Equipment, and after the processing by the initialization unit, set a cell in which the acknowledge information is returned from the User Equipment as "Available", and determine such cells set as "Available" as the cells having the User Equipment subscribing for the Broadcast Multicast Service; or, receive the acknowledge information returned by the User Equipment, set any cell in which the acknowledge information is returned from the User Equipment as "Available", and determine such cells set as "Available" as the cells having the User Equipment subscribing for the Broadcast Multicast Service; and wherein, in the case of the cell cluster:

the return acknowledge information notifying unit is adapted to notify the User Equipment subscribing for the Broadcast Multicast Service to return acknowledge information;

the initialization unit is adapted to determine initially all cells as "Available" and determine initially all cell clusters as "Available"; or determine initially all cells as "Null" and determine initially all cell clusters as "Null"; and the reception and statistics unit is adapted to receive the acknowledge information returned by the User Equipment, and after the processing by the initialization unit, set a cell in which no acknowledge information is returned from the User Equipment as "Null", set a cell cluster as "Null" if all cells in the cell cluster are set as "Null", and determine the cell cluster set as "Available" as the cell cluster having the User Equipment subscribing for the Broadcast Multicast Service; or, set a cell in which no acknowledge information is returned from the User Equipment as "Available", set a cell cluster as "Available" if all cells in the cell cluster are set as "Null", and determine such cell clusters set as "Available" as the cell clusters having the User Equipment subscribing for the Broadcast Multicast Service.

9. The device of claim 7, wherein the auxiliary cell or cell cluster determining unit comprises a neighboring cell or cell cluster determining unit, and a set subtracting unit, the neighboring cell or cell cluster determining unit is adapted to determine all cells or cell clusters neighboring to each cell or cell cluster determined by the Broadcast Multicast Service related cell or cell cluster determining unit; and the set subtracting unit is adapted to subtract a set consist of the cells or cell clusters determined by the Broadcast Multicast Service related cell or cell cluster determining unit from a set consist of neighboring cells or cell clusters determined by the neighboring cell or cell cluster determining unit, so that the auxiliary cells or cell clusters are obtained as a result of the subtraction.

* * * * *